United States Patent [19]

Caprio et al.

[11] Patent Number: 4,556,953

[45] Date of Patent: Dec. 3, 1985

[54] INTERCHANGEABLE INTERFACE CIRCUITRY ARRANGEMENTS FOR USE WITH A DATA PROCESSING SYSTEM

[76] Inventors: A. Ronald Caprio, 21 Francis Wyman Rd., Burlington, Mass. 01803; John P. Cyr, 146 Hartwell Ave., Littleton, Mass. 01460; Bernard O. Geaghan, 203 Edgebrook Dr., Boylston, Mass. 01505; Paul C. Kotschenreuther, 71 Derby Rd., Berlin, Mass. 01503; David J. Schanin, 5 July Rd., Sudbury, Mass. 01776; Ronald M. Salett, 42 Oakvale Rd., Framingham, Mass. 01701

[21] Appl. No.: 351,718

[22] Filed: Feb. 24, 1982

[51] Int. Cl.[4] .......................... G06F 3/00; G06F 3/04
[52] U.S. Cl. ...................................................... 364/900
[58] Field of Search ............................... 364/200, 900

[56] References Cited

U.S. PATENT DOCUMENTS

| 3,102,767 | 9/1963 | Schneck | 339/176 MF |
|---|---|---|---|
| 3,848,233 | 11/1974 | Lotan et al. | 364/200 |
| 3,997,879 | 12/1976 | Markley et al. | 364/900 |
| 4,001,790 | 1/1977 | Barlow | 364/200 |
| 4,025,906 | 5/1977 | Riikonen | 364/200 |
| 4,124,888 | 11/1978 | Washburn | 364/200 |
| 4,130,865 | 12/1978 | Heart et al. | 364/200 |
| 4,155,115 | 5/1979 | Wilkske | 364/900 X |
| 4,171,541 | 10/1979 | Houpt | 364/900 |
| 4,223,380 | 9/1980 | Antonaccio et al. | 364/200 |
| 4,271,465 | 6/1981 | Ohtsuka et al. | 364/200 |
| 4,303,993 | 12/1981 | Panepinto, Jr. et al. | 364/200 X |
| 4,430,584 | 2/1984 | Someshwar et al. | 364/900 X |

Primary Examiner—Eddie P. Chan
Attorney, Agent, or Firm—Ronald T. Reiling; Lester S. Grodberg

[57] ABSTRACT

The present disclosure is directed to an arrangement whereby any one of a plurality of different or similar interface circuit cards can be located into any one of a number of slots or holding means of a data processing system, without preassignment thereto, and whereby each of the interface circuit cards will generate its own diagnostic routine signals and signals representing its own identification, the latter signals being used in a self-configuration operation of the system and whereby an arbiter means is employed to determine, among the plurality of interface circuits, which has the highest priority in the event more than one of said interface circuits is requesting the use of a common data flow path.

8 Claims, 7 Drawing Figures

INTERCHANGEABLE INTERFACE CIRCUITRY ARRANGEMENTS FOR USE WITH A DATA PROCESSING SYSTEM

BACKGROUND OF THE INVENTION

The present invention is the fulfillment of a philosophy that would permit users of computer systems (particularly small computer systems whose users would unlikely have resident sophisticated computer programmers) to configure, or tailor, a system to individual needs, or desires, by adding to, or taking from, the system peripheral devices such as video display devices, floppy disc data storage devices, hard disc data storage devices, printers, communication facilities, tape handlers, telephone management systems and the like, without certain constraints and concerns. For instance, in some prior art systems, it has been a user concern that if the user fails to place the physical circuitry, or the correct circuit card, in the correct engagement location of the system chassis, then the peripheral (believed to be connected) would not operate properly and indeed the whole system may not operate properly.

The concept of adding modules to increase the memory capacity of a data processing system, or adding modular peripheral devices to a data processing system to increase the operating features, is well understood in the computer art. However, heretofore a system which permitted such "modular" addition and subtraction required that the system provide a number of hardware (circuitry) features to accommodate the addition of the modules (i.e., interface circuits and peripherals). For instance, with respect to a first feature of prior art systems, each interface circuit card has resident decoding circuitry as part thereof, so that when the master system wants to communicate with a modular device, the interface circuit can be addressed, irrespective of its physical location amongst the slot means which hold such interface circuit (cards). Such decoder circuitry has been fabricated, in the prior art, such that for each rodular device, of a given type (e.g., a floppy disc device), a standard address circuitry configuration is provided, and if the standard address were to necessitate a change, jumpers or wirewrap changes are added, or made, to the address decoding circuitry to "change the address." Thirdly, while such systems do permit a certain amount of interchangeability (because each interface circuit is addressable), such systems have normally required that the interface circuit cards be particularly placed in an ordered arrangement of slots to implement a method for determining priority amongst a group of active interface circuits.

The circuitry which effects a serial scanning of the "ordered" slots has, in the prior art, been some form of "daisy chain" configuration. Such configurations require that there be no empty or vacant slots between active interface circuit cards and this is a constraint which prior art circuits have suffered. In addition, as the number of possible modular peripherals, which could be added, increased, the amount of memory space required for the addresses of the I/O devices, per se, increased. Further since the diagnostic routine instructions, in the prior art, are stored in a memory device of the main system, as the number of modular devices, which optionally could be added, increased, the amount of memory space required to store diagnostic routines for interface circuits (and peripherals per se) increased. The increased use of memory space, described above, of course reduces the amount of memory space available for uses with problem solving programs. Such memory reductions are overcome by adding memory capacity at additional costs.

The present invention eliminates the necessity of having address decoding circuitry on each interface circuit card; eliminates the "ordering" of interface circuit cards in particular slots, to accommodate a priority determination plan; permits vacant slots to exist between active interface circuit cards; eliminates the need to use memory address space to accommodate addresses for increased numbers of optional peripheral devices; and eliminates the waste of memory capacity to accommodate additional diagnostic instructions as the number of optional peripheral devices is increased.

SUMMARY

The present invention provides that as each interface circuit card is inserted into the chassis it causes a signal to be generated which indicates that there is an option card present at the particular physical location in which the card is inserted. The present system further provides that each circuit card is connected to a location address terminal located in the holding means which address terminal is in turn connected to a decoder circuit in the data processing system. The first of these features insures that in the event a circuit is addressed at that location and in the event that such a circuit is not present, the system would not interpret the lack of communication as being a faulty circuit. The second of the features reduces the hardware for addressing any one of the circuit cards and operates to simplify a self-configuration of the system to accommodate the interchanging of circuit cards. In addition, the present invention provides that each interface card has a means, in the preferred embodiment a ROM, with which to generate a plurality of signals to identify which interface card is present, when the interface card is addressed by its location address. The immediate foregoing feature enables the system to generate a configuration table in memory, whereby the system can "look up" a slot address in response to address signals representing a particular interface circuit card (i.e., a particular peripheral device). The present invention further provides an arbiter arrangement whereby when two or more of the interface cards (in response to their associated peripheral devices) request control of a common data flow path, a determination can be made as to which of the requesting interface circuits should be placed in control because of its preassigned priority.

The features and objects of the present invention can be better understood by considering the following description taken in conjunction with the drawings, wherein:

FIG. 2 is a more detailed block diagram of an interface circuit card mounted in the holding means of a data processing system; and wherein

Figure 1:
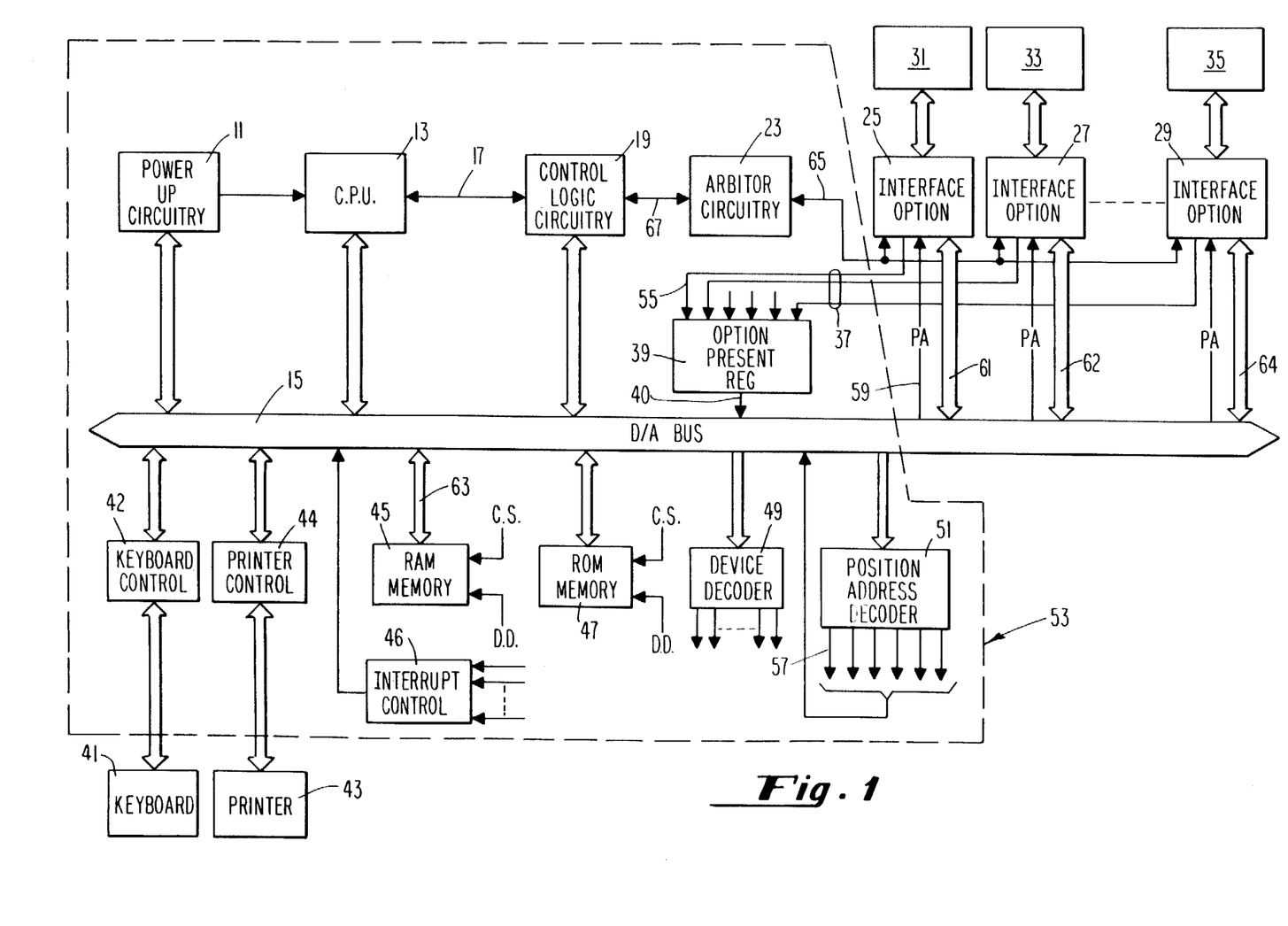
FIG. 1 is a block diagram schematic of the overall system.

Consider FIG. 1. In FIG. 1, there is "power up" circuitry 11 which is connected by a one way data flow path to the CPU 13 and a single direction data flow path to the data address bus 15 (D/A bus 15). The CPU 13 is connected by a bidirectional signal flow path to the data address bus 15. In addition, the CPU 13 is connected to the control logic circuitry 19 by a bidirectional signal path 17.

The control logic circuitry 19 is coupled by a bidirectional signal path to the D/A bus 15 and by a bidirectional signal path to the arbiter circuitry 23. The control logic circuitry 19 provides control signals labeled C.S. to many of the circuit elements throughout the system.

In the right hand portion of the FIG. 1, there are shown three interface option circuit cards, 25, 27 and 29. The dash line between the interface cards 27 and 29 is set forth to represent that there are a number of other interface circuits available to the system. In a preferred embodiment there are six such interface circuit option cards. Each of the interface option cards 25, 27 and 29 is respectively coupled through a bidirectional signal flow path to associated data responsive means 31, 33 and 35. The data responsive means can be peripherals such as a floppy disc drive, a hard disc drive, a video display device, a communication facility to be used with a telephone system or otherwise, a tape drive, and the like.

Each of the interface circuit option cards is shown connected through an associated one of the lines 37 to the option present register 39. The option present register 39 is shown coupled by unidirectional data flow path 40 to the data address bus 15. Many of the data flow paths are shown as a double line in the drawings and this is set forth in that way in order to indicate either heavy traffic datawise or a plurality of lines. However, it should be understood that any of the data flow paths shown as a single line in the drawings may, in fact, represent a number of wires or number of ohmic connections to the units to which they are shown connected.

Each of the interface circuit option cards 25, 27 and 29, is shown connected by a bidirectional signal path 65 to the arbiter circuitry and through a single direction current path (such as path 59) labeled P.A. (position address) to the data address bus 15. Further, each of the interface circuit option cards 25, 27, and 29 is shown connected by a bidirectional signal path (61, 62, and 64) to the data address bus 15. The significance of these various paths to the data address bus 15 from the interface circuit option cards will become more meaningful in accordance with the description hereinafter.

In the lower left hand section of FIG. 1, there can be seen a keyboard 41 which is connected through an interface circuit 42 to the data address bus 15 by a bidirectional signal flow path and there can also be seen a printer 43 which is connected through an interface circuit 44 by a bidirectional signal flow path to the data address bus 15. In addition, there is shown an interrupt control means 46 connected by a unidirectional signal path to the D/A bus 15. To the right of the interrupt control circuit 46, there can be seen a RAM memory 45 which is connected by a bidirectional path 63 to the data address bus 15 and to the right of the RAM memory 45, there is shown a ROM memory 47 which is also bidirectionally connected to the data address bus 15. Finally, there are shown the device decoder 49 which is connected by a unidirectional data flow path to the D/A bus 15 and the position address decoder 51 which is connected by a single directional data path to the D/A bus 15.

When the power to the system is first connected, or turned on, the "power up" circuitry develops four levels of DC power and in the preferred embodiment such power is at +5 volts, −12 volts, +12 volts, and of course, 0 volts. The generation of the DC power is accomplished in a conventional way and is well understood by those skilled in the art. In the present system, when the power has stabilized, there is generated a first "power ok" signal which is transmitted to the CPU 13 and causes the CPU to fetch an instruction from ROM 47 which, in conjunction with the control logic circuitry 19, can effect a reset or clear signal to all of the units in the system that have to be cleared and/or reset. It should be understood in this description, that a great deal of the data processing system is not shown because the invention does not reside therein and that in order to simplify the description, much of the data processing system per se will not be described in detail. The steps which are being described now are for background to make the understanding of the description related to the invention clear. In each case when an operation is described in conjunction with well-understood computer circuitry, the description will state the same. In connection with the operation being presently described, in particular that related to the CPU, it should be understood that the CPU 13 can be any one or more of a number of CPU chips and can be purchased from a number of integrated circuit manufacturers. In a preferred embodiment, the CPU can be a CPU of the type described in the publication "Micro Computers And Memories," published by Digital Equipment Corporation and copyrighted in 1981. The ROM 47, can be any one of a number of ROM memories which are commercially available and in a preferred embodiment, the ROM memory 47 is a TMS-4764 manufactured by Texas Instruments Corporation.

The control logic circuitry 19 must include a clock signal generator which provides an address strobe signal during a first period, a dead period thereafter, followed by a data strobe signal and a dead period thereafter with the foregoing clock signal cycle then repeating itself. The control circuitry must be able to "idle" the clock generator on command. In addition, the control circuitry must be able to provide control signals, such as read and write signals to direct data signal flow or address signal flow into and out of a common data flow path. Such control circuitry can be implemented in a number of ways and such ways are well understood at this point in time to those skilled in the art of data handling devices, such as computers. After the clearing operation, a second "power ok" signal is generated by the "power up" circuitry and this signal is transmitted to the CPU 13. In accordance with the second "power ok" signal, the CPU 13 fetches instructions from the ROM 47 and the system units shown on the mother board 53, as outlined by the large dash lines, are subjected to a diagnostic routine. Diagnostic routines are well understood in the computer art and hence, such routines will not be discussed in this description.

After the system has completed the diagnostic routine or testing of the critical units on the mother board 53, instructions from ROM 47 cause the CPU 13, through the control logic circuitry 19, to address the option present register 39 and in particular interrogate the zero position thereof to find out whether or not there is a signal on line 55. When the interface circuit option card 25 is physically inserted into the holding means, or slot of the chassis portion of the system which holds the cards, there is a closing of a switch which provides a signal on line 55 to indicate that there is a card present in that zero position. The system first interrogates the register 39 to make that determination because if it did not do so and it went directly to the step of addressing interface circuit card 25, for whatever reason it was going to interrogate that card, the lack of a card being present might indicate to the system that the circuitry on the card 25 was not operating correctly or in even a worse situation, might cause the operation to be "hung up."

After the system has interrogated register 39 and determined that there is a signal on line 55, the system in accordance with further instructions from ROM 47 sends the address signals for slot zero to the position address decoder 51. The position address decoder 51 is capable (in a preferred embodiment) of generating six distinct P.A. signals. As was mentioned earlier, in a preferred embodiment there are six options available, and accordingly, there are shown six lines and six such signals, although other numbers of options may be used. Since the address signals for the zero position have been transmitted to the position address decoder 51, only the zero P.A. line 57 will have a signal thereon, and this will be transmitted to the data address bus 15 and therefrom, along line 59, to the interface circuit option card 25. As will be better understood from the description of FIG. 2, the signal on line 59 enables certain logic circuitry present on the card 25. In a preferred embodiment, the same address word which provides address signals to the position address decoder 51 also provides bits or signals to the interface card 25 through the bidirectional current path 61. In the preferred embodiment there are seven such bits available although it should be understood that other numbers could be used. The seven bits provide 128 possible addresses to the interface card 25 (as well as to all of the other interface cards at the proper time). In the first operation, normally, the seven bits would be decoded in the interface circuitry to cause a memory device on the interface card to transmit or generate signals which identify what interface card is present. Accordingly, in response to the system's initially addressing a slot position there is transmitted from the interface card a set of identification signals which identify what interface card is present and therefore, what peripheral device is coupled to that particular slot or holding means position. The identification signals are used by the system to help generate a configuration table in memory. This can be done in accordance with a number of software techniques. In a preferred embodiment a certain portion of the memory is reserved for storing the information related to position addressing a circuit card. The slot position addresses are stored in that certain portion of memory as part of the configuration table. The address information used to fetch a position address from the configuration table, is generated in part by the identification signals obtained from the ROM 123 (FIG. 2) located on the interface circuit card. In this way when an application program is underway, for instance, from a floppy disc and it is the intention of the program to address the peripheral associated with interface circuit 25, the identification signals will be used in part to address the configuration table and accordingly, the position address signals will be fetched therefrom and transmitted to the decoder 51 to generate a P.A. signal for the slot zero, wherein the card 25 is located.

The foregoing feature is one of the features which enables an interface card to be readily interchanged amongst any of the six slots in which it might be located. Because the interface circuit cards generate their own identification signals and those signals are used in part to formulate a configuration table in memory, a program need not be changed to insure that the system knows that a certain interface circuit card is in a certain location. The self-configuration may even be transparent, or unknown, to the user.

Because such a system can have any number of interface circuits for use with the system and because that number increases with expanded applications, heretofore, such a system sacrificed large segments of the system's memory for: (1) providing I/O addresses for each of the possible interface cards used; and (2) for storing, in the system's memory, diagnostic routines to be run on each of the possible interface circuits which could be used.

The present system mitigates the use of memory address space for circuit card addresses by having the slots addressable and by formulating a configuration table to effect addressing simply six slots (as compared to consuming address space for N circuit cards in the prior art devices) irrespective of how many circuit cards could be employed. Further, the present system eliminates storing diagnostic routines for each circuit card which could be used, by providing, on each circuit card, a memory device wherein there is stored a diagnostic routine, or a set of instructions, for testing the critical elements of the interface circuitry of that particular card.

The system continues to operate with the instructions from ROM to test every holding member position to find out whether there is an option card present by virtue of the option present register 39 and to fetch from every location, having an option card present, the identification signals of the interface circuitry present at each location. After the self-configuration has been accomplished, the system is ready to properly address each of the slots, or holding member positions, in response to address signals of which a part identify the circuitry at the respective slots.

Thereafter, the system will continue by running diagnostic routines on each of the cards 25, 27 and 29. The system will accomplish the foregoing by addressing the interface circuits by their addresses and causing a ROM on each of the cards to be stepped through a series of steps which in turn will provide instructions back to the RAM 45 for testing each of the critical elements of the circuitry card. This will be better understood in accordance with the discussion of FIG. 2.

A further problem that could arise in connection with the interchangeability of the interface circuit cards is the problem of determining which of those circuits or which of the peripherals to which they are connected, should be in fact be granted a request for control of a common data flow path if in fact two or more of the interface cards or the peripherals request such control. If the interface cards remain in a preassigned or predesignated position, then the system could deal with those preassigned or predesignated positions knowing that the position itself represented some form of priority. Since the cards can be interchanged, the priorities with respect to the particular peripherals may or may not be associated with slot positions in which they were located at some previous time. Accordingly, the present system provides for initially determining amongst the circuit cards per se which of the cards has the highest priority.

A priority is assigned to a card by a two bit value and depending upon that value, each circuit card can be preempted by a signal or signals, common to all cards, generated by a higher valued priority circuit card, or cards. To say it another way, a card can preempt, by a signal, or signals, common to all cards, a circuit card of lower priority value. In addition, along the data path 65, there is transmitted a request for control of the common data flow path. By way of example, if any of the peripherals wants to have direct memory access so that information can be transferred directly to the RAM memory 45, without being controlled by the control logic circuitry 19 under the direction of the CPU 13, then such a request, that is a request for meaory access, would be made on the data flow path 65. The arbiter circuitry 23 determines first that there is a request being made, suspends the operation of the CPU through the control logic 19 by transmitting the proper signals along the data path 67 and simultaneously transmits a granted request signal back along the data path 65 to the particular interface circuit board making the request. The details of this operation will be better understood in connection with the description of FIG. 3.

Figure 2:
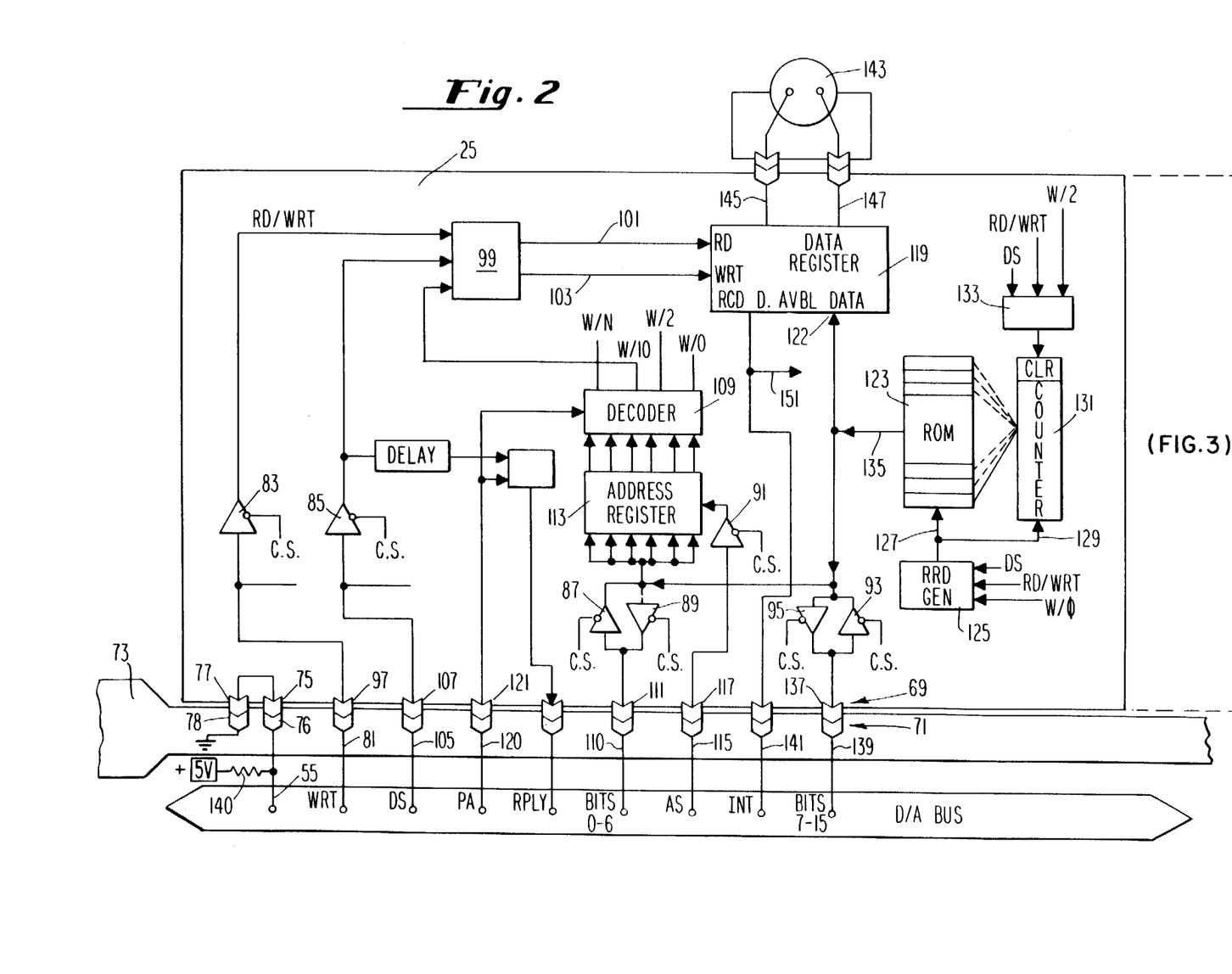

Consider now FIG. 2 which shows one option card 25 which has a plurality of connectors or connector terminals 69 mounted thereon, and which are fitted into a plurality of matching connector terminals 71. The matching connector terminals 71 are mounted in the slot holder or holder means locations in the chassis which is shown as a solid piece of material 73.

When the card 25 is located properly with the holder 73 and is locked into position, the connector terminals 75 and 77 respectively engage the connector terminals 76 and 78 so that a circuit is completed from +5V (actually located on the mother board) through a resistor 140 to ground potential (also actually located on the mother board). Accordingly, an option present (o.p.) ground signal is generated on line 55 when a card is actually present in a slot. The option present signal on line 55 is transmitted to the option present register 39. It should be understood that while in FIG. 1 the option present signals are shown being transmitted directly to the option present register 39, that such a depiction was shown for the purpose of emphasizing the feature with the present system. Actually, the option present lines do pass through the data address bus 15 as shown in FIG. 2.

In FIG. 2 there is shown a write signal designated WRT being transmitted from the D/A bus 15 on line 81. The line 81 either has a write signal which is a low voltage signal or a read signal which is a high voltage signal present at all times. The RD/WRT signal as it sometimes is designated, can cause a memory device to either transmit information therefrom or accept information to be written thereinto depending upon whether or not it is a read signal or a write signal which is present.

At this juncture, it should be remembered, as mentioned earlier, that the control logic circuitry 19 shown in FIG. 1 has a clock signal generator therein, which provides the clock signals to all of the elements in the system requiring the same. Such clock signal generation is well understood in the computer art. The control logic circuitry 19 in addition acts to direct the data flow into and out of the data address bus 15 and into and out of the various elements throughout the system by providing the proper control signals to the proper controllable buffer devices such as the buffers identified by the odd numbers 83 through 95. In a preferred embodiment, the buffer arrangement is as described in U.S. Pat. No. 4,446,382 entitled, "An Arrangement To Time Separate Bidirectional Current Flows," and assigned to the assignee of this application. The write signal on line 81 is transmitted through the connector terminal 97, through the buffer 83 to provide a read/write signal to the logic circuitry 99. The logic circuitry 99 is a series of AND gates and NAND gates which provide two individual output signals, namely a read signal on line 101 and a write signal on line 103.

As mentioned earlier, two signals which are generated by the control logic circuitry 19 are the data strobe signal and the address strobe signal. The data processing system with which the present invention is employed, in the preferred embodiment, acts during one period of time to utilize an address strobe signal and acts during another period of time to utilize a data strobe signal.

The data processing system with which the circuitry of FIG. 2 is employed operates during a first period of time in response to an address strobe signal so that any information which is on the data address bus 15 will be recognized as address information. During a second period of time the system responds to a data strobe signal so that any information which is on the data address bus 15 during that time, is considered as data information, that is, information data which represents a value such as money or data which represents an instruction.

In FIG. 2 the data strobe signal (DS) is shown being transmitted along the line 105 through the connector terminals 107, through the buffer 85, which is shown being controlled by a control signal, and thereafter to the logic circuitry 99.

There is further shown in FIG. 2 a decoder device 109. It will be recalled that earlier there was a discussion to the effect that a set of address signals, being transmitted along the data address bus 15, would contain 7 bits which would provide 128 possible addresses to the interface circuit card. In FIG. 2, it is shown that the 7 bits, that is the 0 bit through 6th bit, are transmitted along the lines 110, through the connector terminals 111, through the buffer 87 to the address register 113. Since the address register 113 receives these signals, during an address strobe time, the address strobe is shown being transmitted along line 115, through the connector terminals 117, through the buffer 91 to enable the address register 113. The address register 113 of course holds the signals and transmits the signals to the decoder 109. In the same set of address signals, there is included a location or position address signal coming from the position address decoder 51 which is transmitted along the line 120, through the connector 121 to the decoder 109. Accordingly, during the address strobe time, the address represented by the seven bits is transmitted to the address register 113 where it is held. It is then transmitted to the decoder 109 where it is decoded into a single signal.

In the illustration shown in FIG. 2, it should be noted that the "word ten" signal or the w/10 signal is a possible resultant instruction signal decoded by the decoder 109 and the w/10 signal is transmitted to the logic circuitry 99. In a preferred embodiment, the word ten or w/10 address means that information should either be read from the data register 119 or written into the data register 119 depending upon whether or not a write signal is present on line 81. Accordingly, the logic circuitry 99 will provide either a read signal on line 101 or a write signal on line 103 and the data register 119 will be conditioned to either accept information through the data port 122 or will transmit data from the port 122. It should be noted that the logic circuitry 99 is enabled during the data strobe time and that the w/10 signal is present during the data strobe time, even though it was generated in response to address information transmitted to the address register 113 during the address strobe time. As was mentioned above, the address register 113 holds that information so that it is available during the data strobe time.

There is further shown in FIG. 2 a ROM device 123. The ROM device 123 can be one of any number of ROM devices and in the preferred embodiment is a TMS-4764 manufacturerd by Texas Instruments Corporation. Coupled to the ROM device 123 is an enabling signal generator 125 which generates an enabling signal or a ROM read signal on lines 127 and 129. The enabling signal generator 125 (or ROM read signal generator) is simply a logic circuit made up of AND gates and NAND gates which respond to the presence of a data strobe signal, a read/write signal, and a word zero signal. In other words, there would have to be present in the zero through six bits of the address information (transmitted on line 110) the proper combination of bits to generate the w/0 signal from the decoder 109 during the presence of a P.A. signal. When the w/0 signal or word zero signal is present in conjunction with the read/write signal and the data strobe signal, the ROM read signals on lines 127 and 129 are generated. The ROM read signal on line 129 acts to increment the counter 131. The counter 131 in the preferred embodiment employs two 74LS393 devices manufactured by Texas Instruments Corporation but other suitable integrated circuit counters could be used. The counter 131 is cleared or reset in response to a clear signal generated by the logic circuit 133. The logic circuit 133 is a circuit of AND and NAND gates, which respond to provide an output signal when a data strobe signal, a RD/WRT signal, and a W/2 signal are simultaneously present. As was set out in the description with respect to the word zero signal, in order to have the clear signal generated, there would have to be present in the zero through six bits of the address information, the right combination of bits to generate a W/2 signal from the decoder 109. Accordingly, when it is the purpose of the system to clear or reset the counter 131, a W/2 signal is generated and the counter 131 is reset to zero. Thereafter, every time that a word zero signal is generated (in conjunction with DS and RD/WRT signals), not only is the ROM 123 enabled for a readout, but the counter 131 is incremented. As the counter 131 is incremented it causes the information stored in the next position of the ROM 123 to be read out.

The ROM 123 is the device wherein the diagnostic routine, mentioned earlier, is located. As the counter 131 is incremented each of the steps in the diagnostic routine is transmitted on the lines 135, through the buffers 95 and 89, through the connector terminals 137 and 111, along the lines 139 and 110, to transmit the 0 through 7th bits, to the data address bus 15. In the case of the diagnostic routine, this information is transmitted back to the RAM 45 (FIG. 1) and is used by the CPU 13 and the control logic 19 to effect a diagnostic routine or testing of the elements of the card 25. Obviously, other information could be stored in the ROM 123 for use as the system deems appropriate and this is one of the advantageous features of the present system. The identifying signals, which identify which interface circuit is present, are normally stored in the first two positions of the ROM 123. When the counter 131 has been reset to zero and the ROM read signal is generated, the identifying signals are transmitted along the lines 135, through the buffers 95 and 89, through their associated connector terminals, along the lines 139 and 110 to the D/A bus 15.

As can be further seen in FIG. 2, there is an interrupt signal which if generated, would be present on line 141. The interrupt signal can be generated from a device such as the data register 119, and in particular, from a port which is identified as "received data available". In the example shown in FIG. 2, the data register 119 would have received the data from a peripheral connected to the terminal 143 and that information would be available. Accordingly, the circuitry on circuit card 25 would indicate to the data processing system and in particular to the interrupt control circuitry 46 (FIG. 1) that it was ready to transmit such information or data. Depending upon what peripheral is being served by an interface card and what types of logic might be present on the card, different kinds of interrupt signals could be available on line 141.

Also as can be seen in FIG. 2, there are two data flow paths 145 and 147 to respectively receive information from the peripheral and transmit information to the peripheral.

Figure 3:
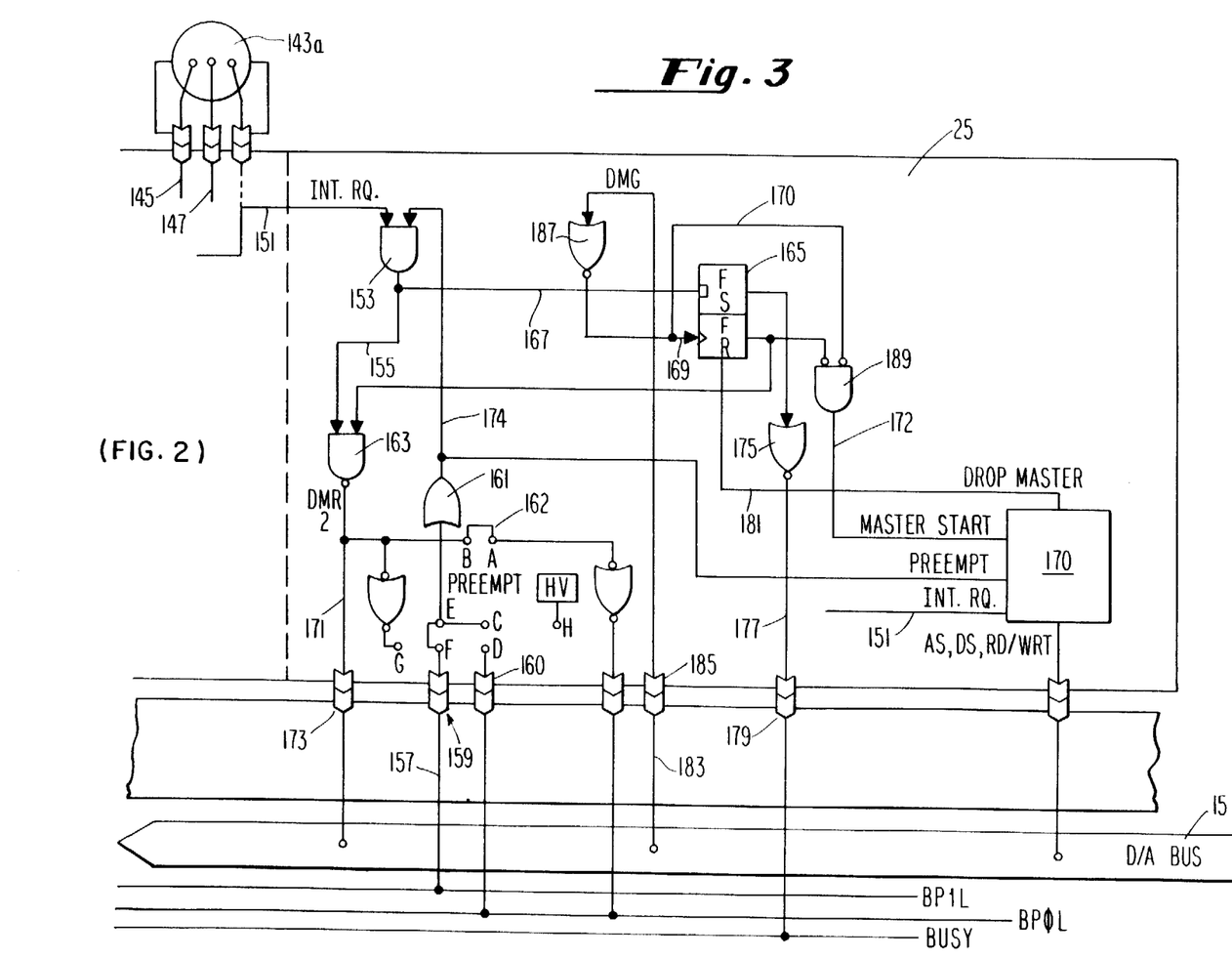
FIG. 3 is a block schematic diagram of a priority circuit.

Consider FIG. 3. FIG. 3 depicts a circuit which would be added to the basic circuit (of interface card 25) of FIG. 2 in order to effect a priority condition. The circuit of FIG. 3 is designed to be preempted by higher priority condition of another circuit, but provides means to preempt another circuit or circuits of a lower priority condition. The request signal deaonstrated in FIG. 3 is that of "direct memory access" with the shortened notation DM. "DMR" means direct memory access request, while "DMG" means direct memory access granted. It should be borne in mind that other forms of control could be requested within the spirit of the inventive concept taught here. A brief look at the table shown by FIG. 4a will assist in an understanding of FIG. 3. Note in FIG. 4a that a circuit which is assigned a priority $P_0=0$ and $P_1=0$ is considered as having a level 0 or level zero priority. Level zero is the lowest priority in the arrangement being taught. Note further that a level "one" circuit, (which is the next higher level above level zero), has priority values of $P_1=0$ and $P_0=1$ while a level "two" circuit (which is the highest priority circuit in the arrangement being taught), has priority values of $P_1=0$ and $P_0=1$. Consider FIG. 3 again.

In FIG. 3, there is shown a circuit having a level one priority. The circuit is connected (along with the circuit shown in FIG. 2 and previously discussed) to the peripheral device 31 (FIG. 1) through the connection 143A. When the peripheral is in a state of data handling such that its circuitry needs to gain control of the common data flow path i.e. D/A bus 15, the system (INT. RQ) generates an "internal request" signal on line 151. The internal request signal may be generated by a peripheral device but normally, in the example being considered (i.e., the signal coming from register 119) such signals are in lieu of an interrupt signal. In the present example, this is a request to effect a direct memory access, i.e., to transfer data directly to memory in the data processing system. The internal request signal, which is a high signal, is transmitted to the AND gate 153. The other input signal to AND gate 153 comes from the BP1L line. The BP1L line is shown disposed outside of the D/A bus 15 for the purposes of discussion but in the preferred embodiment it is located in the D/A bus 15 as are the lines "BP0L" and "BUSY".

As will become clearer as this portion of the circuit is discussed, if another interface card were subjected to an internal request and it had a level two priority, then the BP1L line would be experiencing a low signal and AND gate 153 would not be fully conditioned to provide a high output signal on line 155. For the moment, let us consider that there are no higher priority circuits providing signals to the BP1L line and hence, the line is providing a high signal along line 157, through the connector terminal 159, through the OR gate 161 to the AND gate 153. Accordingly, if there were no higher priority circuits requesting control of the direct memory access, then AND gate 153 of circuit card 25, would provide a high signal to the NAND gate 163. The NAND gate 163 operates such that if there are two high input signals, there will be a low output signal, while if there is one low input signal there will be a high output signal. The other input signal to the NAND gate comes from the output terminal of the reset side of the flip-flop 165, which is high when flip flop 165 is reset.

The flip-flop 165 is a D-type flip-flop which can be transferred to its set side by a high signal on line 167 only when simultaneously there is present a clock signal, low to high transition, on line 169. In the circuitry of FIG. 3, the clock signal is an inverted DMG signal from the NOR gate 187. The DMG signal is a pulse signal of sufficient duration to permit the flip-flop 165 to be transferred and to "settle down." In the situation under discussion, a high signal has been produced on line 167 which attempts to transfer the flip-flop 165 to its set side, but since the DMG has not yet been generated, flip-flop 165 is not so transferred. Since there is one high signal to the gate 189 (from the reset side of flip-flop 165), that gate is not conditioned to produce a master start signal. The signal labelled DMR2 means a request for direct memory access and from the particular card in the second slot. Since there are two high input signals to gate 163, the DMR2 signal is low and is transmitted through the connector terminal 173, to the D/A bus 15. At the same time, the low signal from the set side of flip-flop 165 is transmitted to the driver gate 175 to provide a high impedance signal on line 177, through the connector terminals 179, to the BUSY line which indicates to the system that the circuit is not busy. The signal on line 181 is the reset signal to reset flip-flop 165 and this signal is generated when the mastership is given up. The interface circuit is awaiting a DMG pulse signal on line 183, which is transmitted through the connector terminals 185 to the NOR gate 187. The DMG signal pulse (which is a grant signal from the master system) is a low signal which provides a low to high signal transitions on line 169, and since there is still a high signal on line 167, flip-flop 165 is transferred to its set side. There is now a high signal on line 170 which keeps the gate 189 from being fully conditioned until the flip-flop 165 "settles down". When the DMG pulse terminates there if a low signal to the gate 189 and the gate 189 becomes fully conditioned to provide a master start signal.

In FIG. 3 there is shown a card control logic circuit 170, which is provided with a master start signal from line 172, a preempt signal from line 174, and an internal request signal from line 151. If the master start signal is generated and the internal request signal continues, the card control logic provides the control signals such as DS, AS, RD/WRT and the like, which are required to effect the transfer of data to and from, between the peripheral and any memory means which is addressable via the bus 15. When the transfer has been completed, the internal request signal will be terminated and hence the drop master signal is generated. The drop master signal terminates the control signals from the control circuit 170 and is transmitted on line 181, to reset the flip-flop 165 which in turn terminates the master start signal from gate 189. It should also be noted that the card control logic 170 continues to monitor the preempt signal on line 174 even after the circuitry has taken control of the bus (i.e., became the master). If a higher priority interface card exercises its priority, the preempt signal will condition the card control logic circuit 170 to cause it to generate a drop master signal at the end of the then current bus cycle and accordingly reset the flip-flop 165. As described above the drop master signal causes the circuit to give up control of the bus.

Accordingly, we have seen how the circuitry of FIG. 3 will produce a DMR signal if there are no higher priority circuits seeking control. Consider a situation where a higher priority circuit is seeking control.

If a higher priority circuit (in this case a level "two" priority circuit) had already been subjected to an internal request prior to card 25 being subjected to its internal request, then the BP1L line would be low and the low signal would be transmitted through the connector terminals 159, through the OR gate 161 to render the AND gate 153 non-responsive to the internal request signal on line 151. In short, the low signal on the BP1L line would preempt the circuit on card 25 from generating a DMR signal on line 171. The circuitry of FIG. 3 provides a "last look" feature. If the circuit on card 25 had already generated a DMR signal but the DMG signal had not yet been received from the data processing system and if during this time a higher priority circuit asserts or drives the BP1L line, then the "last look" feature becomes meaningful. It is apparent that the BP1L input signal to the AND gate 153 would become low and hence, the signal on line would go low. Since the flip-flop 165 needs the presence of a high signal on line 167 when the DMG signal is generated, it becomes apparent that there will be no master start and no seizing control of the bus. Hence, it is apparent that even if a circuit has completed its request and is about to receive a grant, the "last look" provides that if a higher priority circuit asserts its priority line, the request will be terminated and a subsequent grant will be ignored.

Figures 4, 4A:
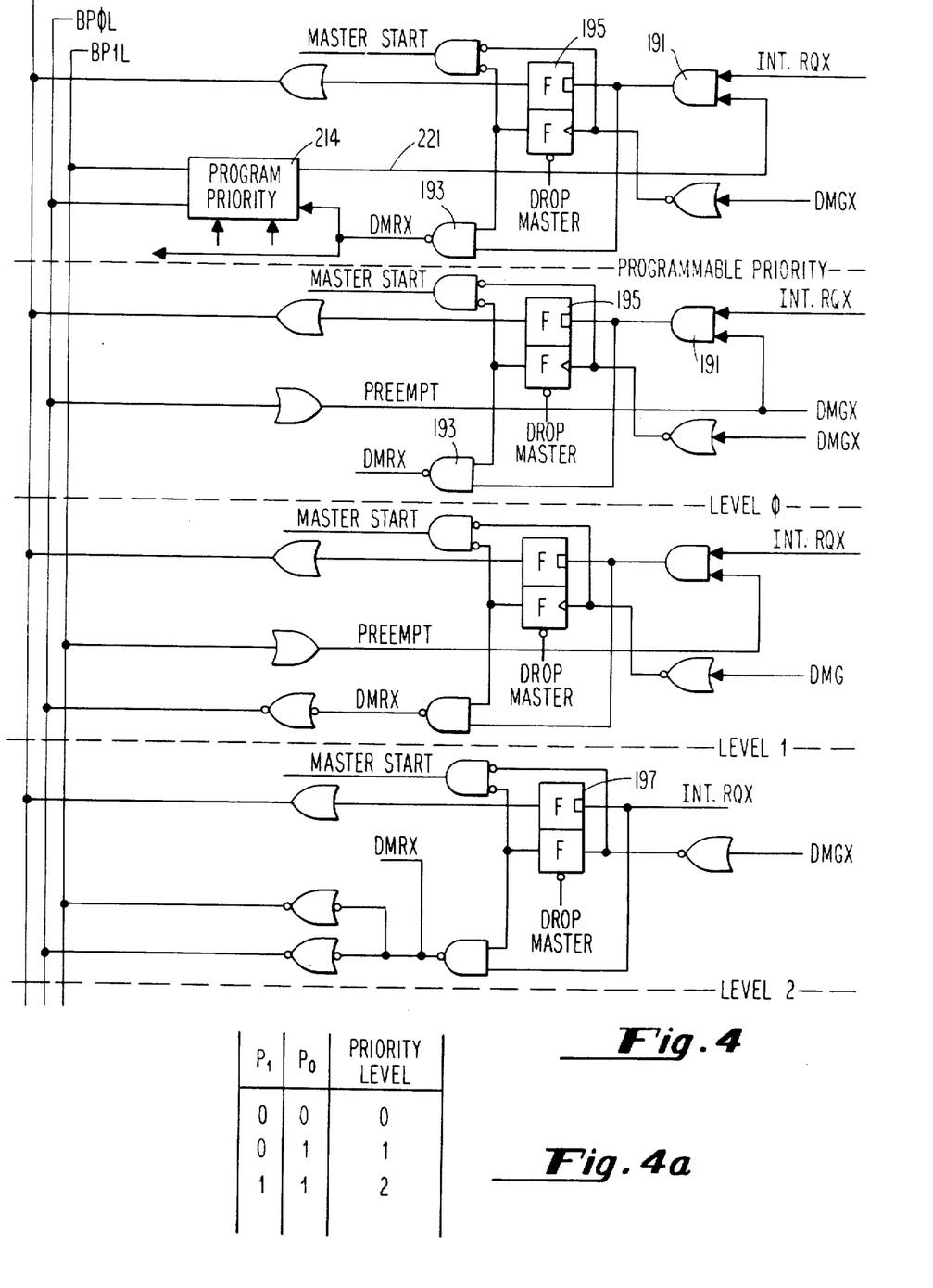
FIG. 4 is a set of block diagrams depicting how priority levels are screened.
FIG. 4a is a table showing various priority levels for interface circuit cards.
Figure 6:
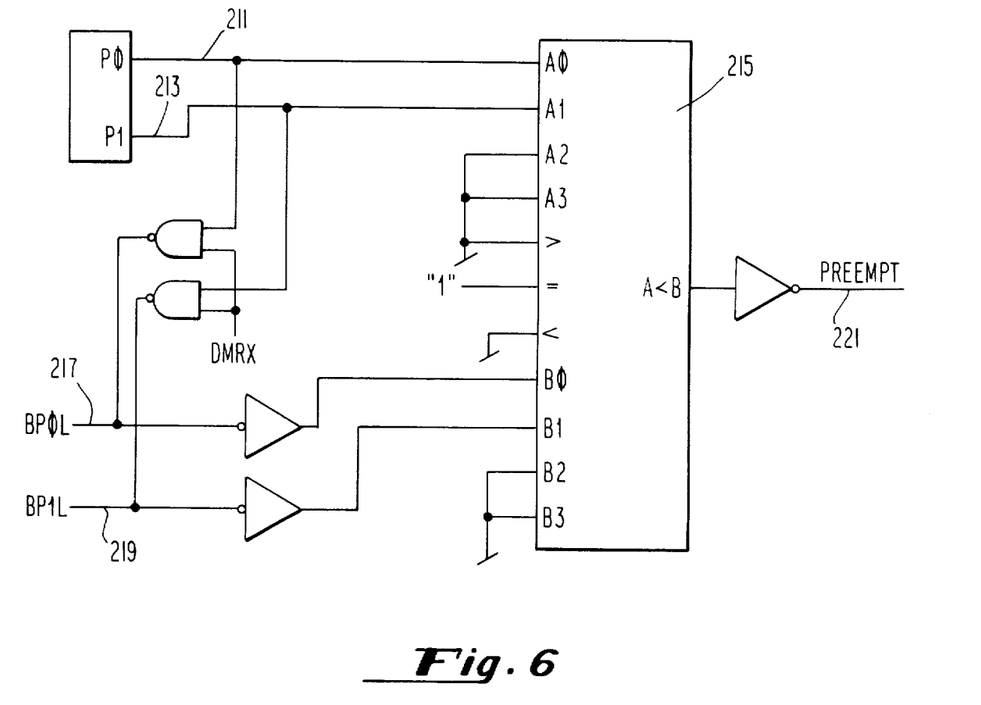
FIG. 6 is a block diagram of a programmable priority device.

Before we examine FIG. 4, examine FIG. 6. In FIG. 6 there are shown two lines 211 and 213. Two signals from a register, in accordance with a program, are transmitted on lines 211 and 213 to the comparator device 215. The comparator device 215 can be any one of a number of commercially available circuits and in a preferred embodiment is a 74S85 manufactured by Texas Instruments Corporation. As can be gleaned from FIG. 6, the lines 217 and 219 are connected to the BP0L and BP1L lines of FIG. 4. Hence, the lines 217 and 219 carry the voltage level signals provided by all circuits participating in the priority arrangement. In the comparator 215 the programmed priority signals for the circuit card on lines 211 and 213, (designated A∅ and A1 in the comparator 215) are compared against the signals present on the BP∅L and BP1L lines (designated as B∅ and B1 in the comparator 215). If A is less than B, then there is provided a low preempt signal on line 221. If A is greater than or the same as B then no low preempt signal is generated.

If we now examine FIG. 4, we find a programmable priority circuit connected to a typical "level" circuit. If there is a low signal on line 221 the circuit is preempted by not permitting the AND gate 191 to be fully conditioned. If the AND gate 191 is not fully conditioned, then the NAND gate 193 will not provide a DMR signal. It should be noted in FIG. 4 that the logic circuit 214 is meant to include the circuitry of FIG. 6. In the level zero circuit, it can be seen that (in a fashion similar to the circuit just described) a low signal on the BP∅L line will preempt the circuit by not permitting the AND gate 191 to be fully conditioned. If the AND gate 191 is not fully conditioned, then the NAND gate 193 will not provide a DMR signal. The circuitry arrangement for the flip-flop is the same as that described with FIG. 3. The level one circuitry is the same as that described with FIG. 3. The level two circuitry differs somewhat in that there is no preemption circuit. Note that the internal request signal is transmitted directly to the flip-flop 197. Since the level two circuit is the highest priority circuit there is no higher priority to preempt it. Note also, in the level two circuit, that both the BP∅L and BP1L lines are driven low to render any lower priority circuit in a preempted state. Now, if there are two circuits of the same priority requesting control of the common data flow path, then we have to examine the circuitry of FIG. 5 to understand how the priority question is settled. However, before FIG. 5 is studied, let us re-examine FIGS. 3 and 4 to understand how the flexible interface circuit can have its priority readily changed.

In FIG. 3 note that there are shown a set of terminals A through H connected or in close proximity to the connector terminals 159 and 160. If the circuit card is to operate with a level one priority, then the jumpers 162 and 164 are placed as shown to provide a preempt signal from its BP1L line and to provide a low signal to the BP∅L line. If the circuit card 25 were to operate with a level zero priority, then the jumper 164 would be located in the C-D terminals to provide a preempt signal from the BP∅L line and the jumper 162 would be removed since the level zero circuits do not drive any lines for preemption. If the circuit card 25 were to operate with a level two priority, then the jumper 164 would be located in terminals G - F and jumper 162 would remain in terminals A - B which would enable the circuit to drive both the BP∅L line and the BP1L line. In addition, there would need to be a jumper between terminals C-H to provide a high level signal from HV (high voltage) to the AND gate 153. The jumper transitions are a simple arrangement which are shown for illustrative purposes only to effect changing the priority arrangement. The circuitry of FIG. 6 is an electronic solution to the problem.

Figure 5:
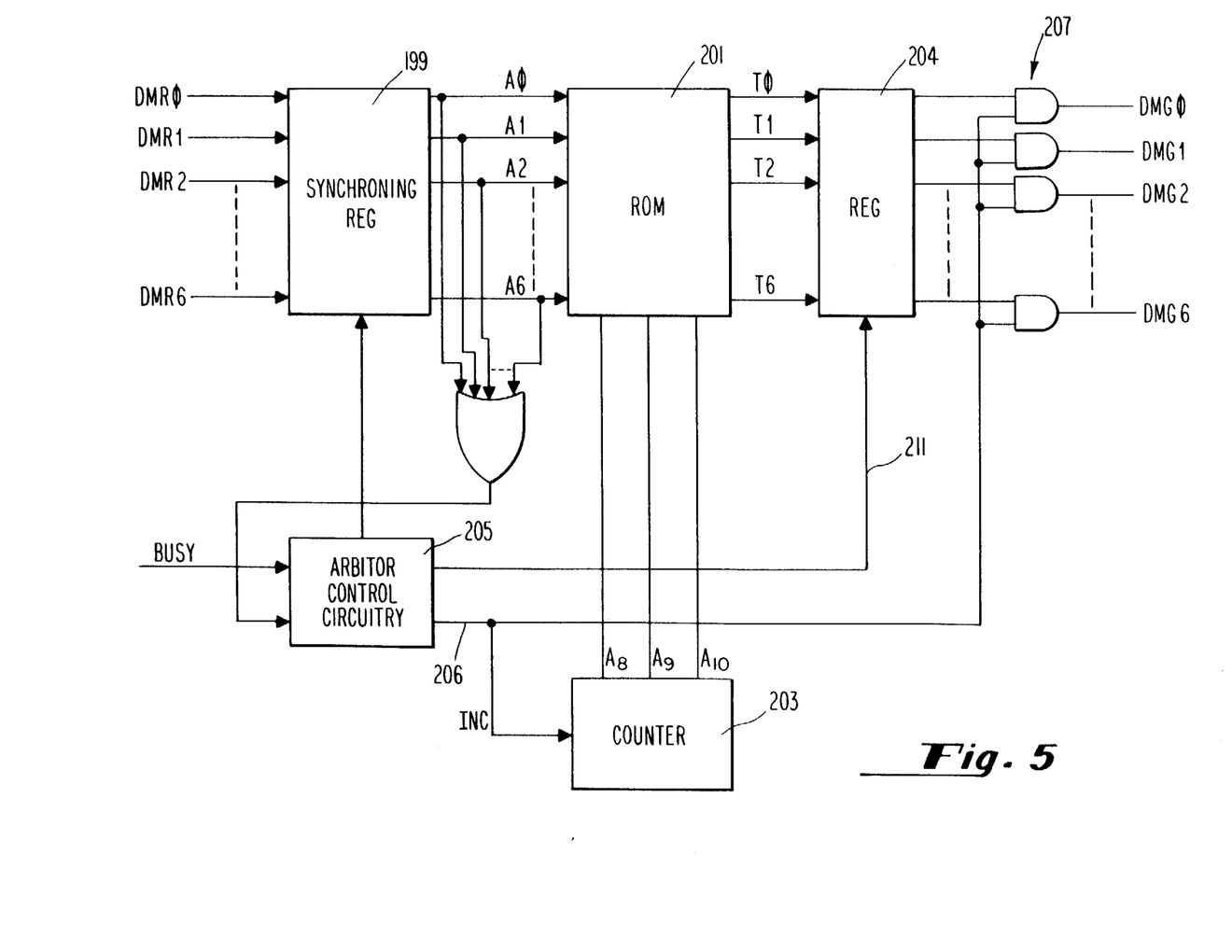
FIG. 5 is a block diagram of a circuit to further determine priority and grant requests.

Consider FIG. 5 which is a circuit for the second stage of priority determination. If two circuits of the same priority are requesting control then a decision must be made as to which circuit in fact gets control. In FIG. 5, there is shown a synchronizing register 199.

Into the synchronizing register 199 are directed all of the DMR signals for each of the slots (0 through 5) plus one other DMR to accommodate the master system which also may want control. The synchronizing register in the preferred embodirent is a 74S374 manufactured by Texas Instruments Corporation. The synchronizing register 199 provides a plurality of address signals A∅ through A6 to the ROM 201. The address information controlling ROM 201 is further conditioned by the output signals from the counter 203. As will be explained below, the counter 203 is incremented so that each "A" address from the register 199 gets an equal opportunity to interrogate the ROM 201 because the lines A∅ through A6 are each conditioned by the commutator action of the counter 203. The ROM 201 operates such that one and only one T signal is passed and stored in the register 204. The foregoing happens in response to a control signal from the arbiter control circuitry 205 which will be discussed below. The output signal from the register 204 is transmitted to the proper one of the AND gates 207 to provide the correct DMG signal (DMG∅ through DMG7). The AND gates 207 are also conditioned in response to control signals from the arbitor control circuitry 205.

The arbitor control circuitry 205 operates in response to a BUSY signal or to the presence of at least one of the "A" signals, as can be seen. In response to a signal on line 206, which means that the arbitor control circuitry is granting a request, the counter 203 will be incremented. At the same time, the control signal on line 211 will transfer the "T" signal to the register 203 and to the proper one of the gates 207 to produce the proper DMG signal.

The present system operates: (1) to permit selection from a large number of possible options without unduly using memory space for I/O addresses; (2) to run diagnostic routines on each interface circuit without having to store such routines in a memory means of the main system; (3) to address interface circuit cards, irrespective of how they are interchanged in their holding means, without providing address decoding circuitry on each interface circuit card; (4) to effect a priority determination amongst requesting interface circuits having different priorities and subsequently amongst requesting interface circuits having the same priority irrespective of where such circuit cards are located in their holding means; (5) to effect a "last look" and continual monitoring after a demand for control of a common data flow path has been made, or has been granted, so that if a high priority request is made the system will act to accommodate that request; and (6) to permit original insertions, interchanging, adding, or removing, of the interface cards without requiring that there be no vacant slots between active interface circuit cards.

The present system has been described employing a plurality of interface circuit cards, but it should be understood that many of the novel features can be employed in a system using only one interface circuit card slot to enable the user to select (one at a time) from a plurality of connectable options and wherein other peripherals, or data responsive means, may be made part of the fixed system. In our copending application, Ser. No. 06/351,721 entitled, "Interchangeable Interface Ciruit Structure", we have described and claimed the interface circuit cards described in this application.

We claim:

1. In association with a data processing system, which includes central processor circuitry means, memory circuitry means holding at least address signals, control logic circuitry means and bus circuitry interconnecting the three last mentioned circuitry means, means for enabling said data processing system to interchangeably utilize any one of a plurality of data signal responsive means, said means for enabling comprising in combination: a plurality of circuit mounting means, each having at least one interface circuit mounted thereon; a plurality of holding means with each having first engageable electrical terminals with said each first engageable terminal having an engageable end and a non-engageable end with said non-engageable end connected to said bus circuitry and with at least one of said terminals being designated an address terminal; first circuitry coupled through said bus circuitry to said memory circuitry means and formed to receive and decode sets of address signals from said memory circuitry means and wherein each set of address signals designates a different one of said address terminals; second circuitry means connected to respectively transmit decoded address signals from said first circuitry through said bus circuitry to associated ones of said address terminals whereby each of said address terminals will be respectively activated in response to its address signals being decoded; a plurality of interface circuitry means with each having second engaging electrical terminals and each of said interface circuitry means located on a different one of said circuit mounting means and each further in engaging relationship with said first engageable terminals of an associated holding means to be thereby connected to said bus circuitry and each interface circuitry means connected to an associated one of said data signal responsive means, and each interface circuitry means further providing identifying signals; instruction circuitry means coupled through said bus circuitry means to said memory circuitry means to provide signals to cause said memory circuitry means to store at an address, determined in part by a set of said identifying signals, a set of said address signals which when decoded represent the address terminal of said holding means whereat the one of said interface circuitry means providing said identifying signals is located.

2. In association with said data processing system and said means for enabling according to claim 1, wherein said data processing means has at least one main data flow path which can be used by various ones of said interface circuitry means in the course of operation and wherein at least two of said interface circuitry means are formed to each have different priority determination circuitry and wherein said priority determination circuitries are connected together and are formed to determine if one of said at least two interface circuitry means has a higher priority to enable such interface circuitry means to be temporarily in control of said main data flow path.

3. In association with said data processing system and said means for enabling according to claim 2, wherein with respect to said at least two interface circuitry means each has an assigned priority value, and wherein there is further included arbitor circuitry means coupled to said at least two priority determining circuitry means and formed to determine which of said at least two interface circuitry means has the higher priority in order to be temporarily in control of said main data flow path in the event that said priority determination circuitry determines that said at least two interface circuitry means have the same priority value.

4. In association with said data processing system and said means for enabling according to claim 2, wherein each of said interface circuitry means has a priority value and each of said priority determination circuitries is formed to generate a demand for control signal, and wherein there is further included a "last look" circuit, which is formed to prevent an interface circuitry means from taking control of said main data flow path after said demand for control signal has been generated, in the event that an interface circuitry means of higher priority generates a demand for control signal to take control of said main data flow path.

5. In association with said data processing system and said means for enabling according to claim 4, wherein said "last look" circuit is further formed to continually monitor the demand for control signals and formed to block an interface circuitry means from controlling said main data flow path, even after said control has been granted to said last mentioned interface circuitry means, in the event an interface circuitry means having high priority generates a demand for control signal.

6. In association with said data processing system and said means for enabling according to claim 2, wherein there is further included a programmable means as part of said priority determination circuitry whereby said priority determination circuitry can generate a priority value for the interface circuit of which it is made a part in accordance with program generated input signals transmitted to said priority determination circuitry.

7. In association with said data processing system and said means for enabling according to claim 1, the further inclusion, as part of each interface circuitry means, a diagnostic memory circuitry means which is formed to have a diagnostic routine stored therein, which routine is particularly directed to the interface circuitry means of which it is a part, and wherein said each diagnostic memory circuitry means is formed to provide instruction data signals to said data processing means whereby said data processing means can cause certain different tests to be performed respectively on each of said interface circuitry means in accordance with said instruction data signals provided by each said diagnostic memory circuitry means.

8. In association with said data processing system and said means for enabling according, to claim 1, the further inclusion of a plurality of option present circuits, wherein at least one different one of said option present circuits is associated with a different holding means and is activated when one of said interface circuitry means is engaged with its associated holding means and the further inclusion of register means connected to said option present circuits to provide signals to said data processing system to indicate which of said interface circuitry means is present.

* * * * *